United States Patent
Yoon et al.

(10) Patent No.: US 10,061,032 B2
(45) Date of Patent: Aug. 28, 2018

(54) METHOD OF SELECTING SATELLITE FOR POSITIONING IN GLOBAL NAVIGATION SATELLITE SYSTEM, SATELLITE SIGNAL RECEIVER, AND METHOD OF CREATING DOP INDEX

(71) Applicant: Research & Business Foundation SUNGKYUNKWAN UNIVERSITY, Suwon Si (KR)

(72) Inventors: Seokho Yoon, Suwon-si (KR); Keunhong Chae, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 518 days.

(21) Appl. No.: 14/725,263

(22) Filed: May 29, 2015

(65) Prior Publication Data
US 2015/0346346 A1 Dec. 3, 2015

(30) Foreign Application Priority Data
May 30, 2014 (KR) .......................... 10-2014-0065882

(51) Int. Cl.
| | | |
|---|---|---|
| G01S 19/28 | (2010.01) | |
| G01S 19/09 | (2010.01) | |
| G01S 19/26 | (2010.01) | |
| G01S 19/42 | (2010.01) | |

(52) U.S. Cl.
CPC .......... *G01S 19/28* (2013.01); *G01S 19/425* (2013.01)

(58) Field of Classification Search
CPC ................................ G01S 19/06; G01S 19/28

USPC ............ 342/357.46, 357.63, 357.65, 357.67; 701/468, 475
See application file for complete search history.

(56) References Cited

U.S. PATENT DOCUMENTS 6,587,692 B1 * 7/2003 Chen ....................... G01S 1/022
342/357.29

FOREIGN PATENT DOCUMENTS

| JP | 2003-57327 A | 2/2003 |
|---|---|---|
| KR | 10-2010-0034628 A | 4/2010 |

OTHER PUBLICATIONS

Korean Office Action dated Jun. 25, 2015 in counterpart Korean Application No. 10-2014-0065882 (4 pages, in Korean).

* cited by examiner

*Primary Examiner* — Dao L Phan
(74) *Attorney, Agent, or Firm* — NSIP Law

(57) ABSTRACT

There is provided a method of selecting a satellite for positioning in a global navigation satellite system, which includes: receiving satellite signals from satellites that a receiver can receive; calculating DOP where pseudorange weight is applied for each of satellite signal combinations including at least four or more of the satellite signals by the receiver; and selecting a satellite signal combination having the smaller DOP than a standard in the satellite signal combinations by the receiver.

13 Claims, 4 Drawing Sheets

METHOD OF SELECTING SATELLITE FOR POSITIONING IN GLOBAL NAVIGATION SATELLITE SYSTEM, SATELLITE SIGNAL RECEIVER, AND METHOD OF CREATING DOP INDEX

CROSS-REFERENCE TO RELATED APPLICATIONS

This application claims the benefit under 35 USC 119(a) of Korean Patent Application No. 10-2014-0065882 filed on May 30, 2014 in the Korean Intellectual Property Office, the entire disclosure of which is incorporated herein by reference for all purposes.

BACKGROUND

Field

The following description relates to a method of selecting a satellite for positioning in a global navigation satellite system.

Description of the Related Art

GNSS (Global Navigation Satellite System) is a series of systems that provides locates an object and provide visual information, using a plurality of satellites and receiving equipment on the ground.

US is in the process of planning to modernize GPSs (Global Positioning System) for improving the quality of public services and Russia is also in the process of normally operating and modernizing a navigation service using GLONASS (Global Navigation Satellite System). On the other hand, EU has constructed Galileo system that is independent GNSS against GPS.

At present, there are various kinds of GNSSs and satellite signals based on different types of modulation are used in even same systems.

SUMMARY

There is provided a method of selecting a satellite for positioning in a global navigation satellite system, which includes: receiving satellite signals from satellites that a receiver can receive; calculating DOP where pseudorange weight is applied for each of satellite signal combinations including at least four or more of the satellite signals by the receiver; and selecting a satellite signal combination having the smaller DOP than the standard in the satellite signal combinations by the receiver.

The satellite signal may be a signal in which at least one of transmission power or modulation is different. The satellite signals may include at least one of a GPS satellite signal, a Galileo satellite signal, and a GLONASS signal.

In the calculating, the receiver determines weight for correction such that satellite signals have the same TESD in a CNR and calculates DOP using a DOP matrix having the weight. When the receiver has difficulty in estimating CNR, the receiver may determine the weight using TESD at the worst CNR.

There is also provided a satellite signal receiver including: a receiving unit configured to receive satellite signal in which at least one of transmission power and a modulation type is different; a signal processing unit configured to calculate DOP where pseudorange weight is applied for satellite signal combinations including at least four or more of satellite signals; and a positioning unit configured to select a satellite signal combination having the smallest DOP calculated by the signal processing unit and to position the receiver.

The signal processing unit may determine weight for correction such that satellite signals have the same TESD in a CNR and calculates DOP using a DOP matrix having the weight by a receiver.

There is also provided a method of creating a DOP index that includes: receiving information of line of sight of a plurality of satellites of which signals can be received by a receiver; creating a DOP matrix using the information of line of sight by the receiver; calculating DOP where pseudorange weight is applied for the satellite signals such that the satellites having the information of line of sight have the same TESD (tracking error standard deviation) at the CNR by the receiver; and calculating a DOP index using a new DOP matrix created by applying the pseudorange weight to the DOP matrix by the receiver.

Figure 1:
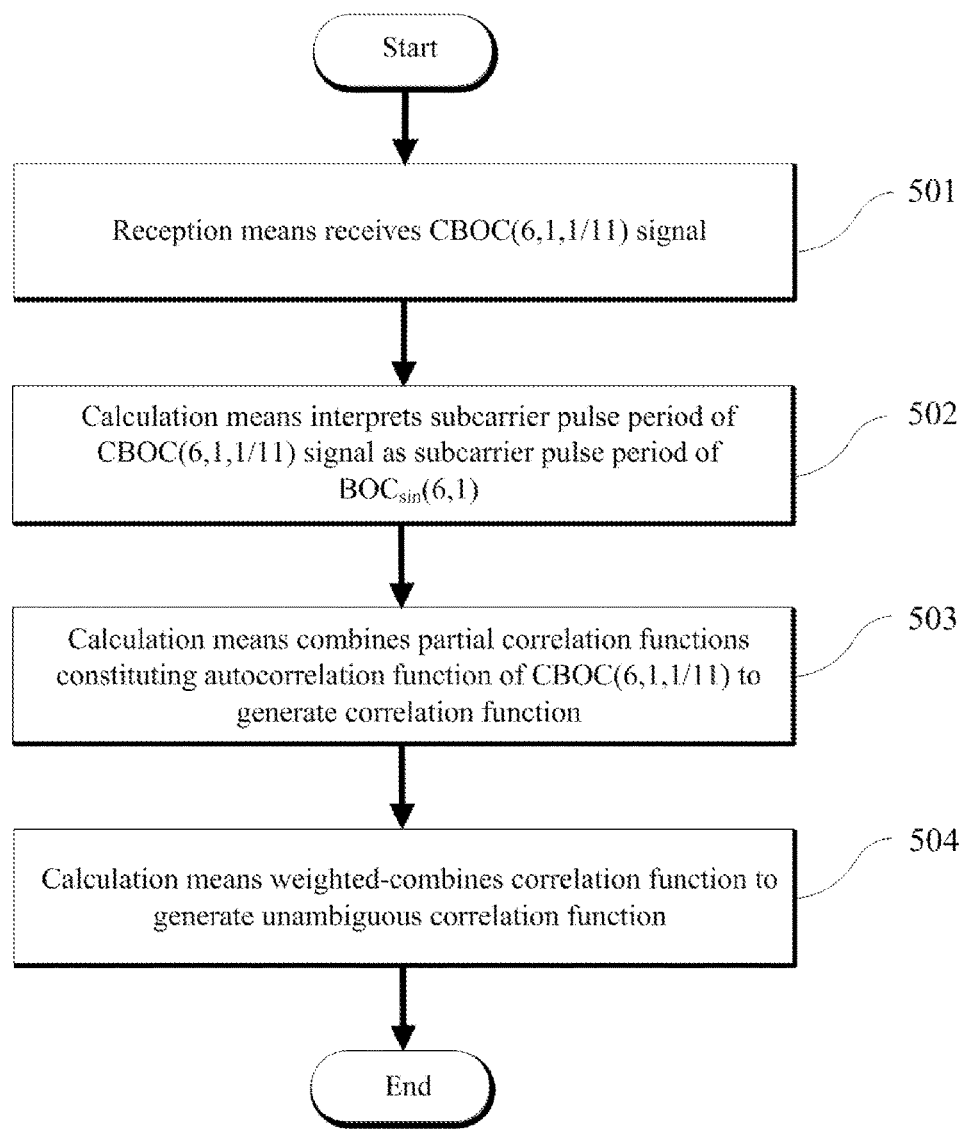
FIG. 1 illustrates an example of a graph comparing TESD performance of BPSK, $BOC_{sin}(n,n)$, and $BOC_{sin}(2n,n)$ signals.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It should also be noted that in performing a method or an operating method, processes of the method may occur out of noted order unlike otherwise mentioned. In other words, the respective processes may be executed in the same order as the noted order, may be executed substantially concurrently, or may be executed in the reverse order.

A user of a global navigation satellite system estimates distance from a satellite by receiving a satellite signal for positioning and uses the estimated distance and position information of the satellite. Pseudorange is estimated by multiplying a difference between transmission time of a satellite signal and reception time of a receiver by the speed of light. The position information of a satellite is obtained by demodulating satellite signals from at least four or more satellites.

Even if a pseudorange error is same, the range of a possible position error may be different, when the geometric positions of satellites for positioning change. The index is DOP (dilution of precision). The DOP is a scaling factor based on a geometric position between a user and a satellite and depends on spatial arrangement of satellite used for positioning by a user. The DOP decreases, as navigation satellites are arranged with less uncertainty.

As Galileo by EU and new global navigation satellite systems by US with modernization of GPS are developed, it is expected that maximum forty satellites will be used for positioning. In particular, it is expected that more satellites can be used for areas where a line of sight between a user and a satellite is difficult to ensure, such as the center of a city. Using different types of navigation satellite signals increases the number of satellite available for positioning, so it is possible to select the satellites in various combinations, so it is possible to further decrease DOP.

The following description relates to a technology of selecting a satellite in consideration of the modulation types and differences between transmission powers of different types of navigation satellites. The following description, as described above, can be applied to positioning through a satellite in different global navigation satellite systems such as a GPS satellite system, a Galileo satellite system, or a GLONASS satellite system. Further, it can be applied to positioning using different satellite signals in the same global navigation satellite system.

First, a DOP index that is stated hereafter is described.

The DOP means uniformity of a DOP visible satellite arranged in a global navigation satellite system, and the lower the uncertainty in satellite arrangement, the lower the DOP. The DOP in a global navigation satellite system is defined as the Equation 1.

$$D = tr[(H^T H)^{-1}] \quad \text{[Equation 1]}$$

where tr(•) is trace of a matrix, $(•)^T$ is transpose of a matrix, and $(•)^{-1}$ is an inversematrix. H is a DOP matrix composed of vectors of line of sight from a user to a satellite, and it is expressed as the following Equation 2 when n satellites are used for positioning.

$$H = \begin{bmatrix} h_{11} & h_{12} & h_{13} & 1 \\ h_{21} & h_{22} & h_{23} & 1 \\ \vdots & \vdots & \vdots & \vdots \\ h_{n1} & h_{n2} & h_{n3} & 1 \end{bmatrix} \quad \text{[Equation 2]}$$

where $(h_{i1}, h_{i2}, h_{i3})$ is a vector of line of sight from a user to an i-th satellite. It can be seen from Equation 1 that the DOP fully depends on H that is a DOP matrix and it can be seen from Equation 2 that the magnitudes of the vectors of line of sight of the DOP matrix are expressed by pseudoranges.

When different navigation satellites are used, the signal modulation and transmission power used by global navigation satellite systems are different, so the global navigation satellite systems have different reliability when pseudoranges are estimated on the basis of received satellite systems. For example, signals are transmitted in BPSK (binary phase shift keying) type in a GPS, but BOC (binary offset carrier) type is used in Galileo, so reliability in estimation of a pseudorange under the same signal-to-noise ratio is increased.

Accordingly, it is preferable to apply weight based on reliability in estimation of a pseudorange to calculation of DOP when different navigation satellites are used. In detail, when a satellite or a satellite signal having at least one of different modulation types or transmission power, it is preferable to use a new DOP matrix obtained by multiplying vectors of line of sight by pseudorange weight $\alpha_i$, as in the following Equation 3.

$$H' = \begin{bmatrix} \alpha_1 h_{11} & \alpha_1 h_{12} & \alpha_1 h_{13} & 1 \\ \alpha_2 h_{21} & \alpha_2 h_{22} & \alpha_2 h_{23} & 1 \\ \vdots & \vdots & \vdots & \vdots \\ \alpha_n h_{n1} & \alpha_n h_{n2} & \alpha_n h_{n3} & 1 \end{bmatrix} \quad \text{[Equation 3]}$$

where $\alpha_i$ is pseudorange weight of a vector of line of sight from the i-th satellite.

In order to use reliability in estimation of pseudorange as the weight $\alpha_i$ for the DOP matrix, TESD (tracking error standard deviation) is used.

In detail, in modulation such as PSK and BOC used in various global navigation satellite systems, TESD in the range of CNR (carrier-to-noise ratio) is respectively obtained and the TESD of the modulation is used as weight for a DOP matrix. It will be described in detail in the following description referring to FIG. 1.

BPSK modulation type used in a GPS is used for PSK modulation type and a BOC signal is respectively expressed by $BOC_{sin}(kn,n)$ or $BOC_{cos}(kn,n)$ in accordance with whether a sine-phased or a cosine-phased subcarrier was used. k is the ratio between the period of a pseudo noise code and the period of a subcarrier and n is the ratio between a pseudo noise code chip rate and 1.023 MHz.

Weight will be calculated, for example, for BPSK, $BOC_{sin}(n,n)$, and $BOC_{sin}(2n,n)$ signals in satellite signals. All of the three signals use the ratio of a reciprocal of TESD when a pseudorange was measured using an autocorrelation function.

FIG. 1 illustrates an example of a graph comparing TESD performance of BPSK, $BOC_{sin}(n,n)$, and $BOC_{sin}(2n, n)$ signals. FIG. 1 illustrates TESD of BPSK, $BOC_{sin}(n,n)$, and $BOC_{sin}(2n, n)$ signals as functions of CNR. For a simulation, a coherent integration in a receiver was 1 ms in all cases, early-late spacing in a determiner was fixed to 0.2 times a pseudo noise code chip range, and the resultants in the range of 20 dB-Hz to 50 dB-Hz that is the concerned CNR range was exhibited.

Referring to FIG. 1, it can be seen that the TESD in BPSK modulation is the largest and the TESD of the $BOC_{sin}(2n,n)$ signal is the smallest. Accordingly, the smallest weight would be applied to the BPSK modulation type and the largest weight would be applied to the $BOC_{sin}(2n,n)$ signal.

TABLE 1

| CNR [dB-Hz] | BPSK | $BOC_{sin}(n, n)$ | $BOC_{sin}(2n, n)$ |
|---|---|---|---|
| 20 | 0.1171 | 0.0745 | 0.0683 |
| 30 | 0.0154 | 0.0094 | 0.0075 |
| 40 | 0.0036 | 0.0021 | 0.0014 |
| 50 | 0.0011 | 0.0006 | 0.0004 |

TABLE 2

| CNR [dB-Hz] | BPSK | $BOC_{sin}(n, n)$ | $BOC_{sin}(2n, n)$ |
|---|---|---|---|
| 20 | 1 | 1.5718 | 1.7145 |
| 30 | 1 | 1.6383 | 2.0533 |
| 40 | 1 | 1.7143 | 2.5714 |
| 50 | 1 | 1.8333 | 2.7500 |

In detail, TESD of the concerned CNRs is obtained first from Table 1. Since the TESD of the BPSK is the largest in the signals, the smallest weight is applied to the BPSK. To this end, weight corrected on the basis of the TESD of the BPSK should be applied to the TESD of other signals. In Table 2, weight for the TESD of the BPSK was set to 1 and "TESD of the BPSK/TESD of another signal" was set as weight for other signals. Table 2 is just an example of weight for satellite signals.

The weight set in Table 2 corrects the TESD of the signals to be the same or close to each other in the CNR ranges. The weight set in Table 2 may be obtained from reciprocals of the ratio of TESD of the modulations. A resultant DOP is obtained by applying the weight in Table 2 to a DOP matrix.

When it is possible to estimate CNR, weight is set using TESD of accurate CNR. On the other hand, when it is difficult to estimate CNR, weight may be set using TESD at CNR=20 dB-HZ that is the worst condition.

For example, assuming that first and second satellites are GPS satellites, a third satellite uses a $BOC_{sin}(n,n)$ signal, and a fourth satellite uses a $BOC_{sin}(2n,n)$ signal, weight is set as $\alpha_1=1$, $\alpha_2=1$, $\alpha_3=1.5718$, and $\alpha_4=1.7145$ respectively.

Consequently, a DOP index $D_{proposed}$ where weight for pseudorange is applied is expressed as the following Equation 4.

$$D_{proposed} = tr[(H'^T H')^{-1}] \quad \text{[Equation 4]}$$

Equation 4 is obtained by replacing H that is a DOP matrix in Equation 1 with H' that is a DOP matrix where the weight $\alpha_i$ is applied.

By applying a reciprocal of TESD according to modulation types and CNRs of different satellite signals to a DOP matrix as weight, the DOP index $D_{proposed}$ considering the modulation type and transmission power of a navigation satellite is created. As the DOP indexes $D_{proposed}$ finally created for different types of satellite navigation are small, it can be determined that the satellites are more suitable. Further, when $D_{proposed}$ is a predetermined reference value (for example, 2) or less, it may be determined that positioning is relatively accurately performed.

Hereafter, the method 100 of selecting a satellite for positioning in a global navigation satellite system, a method 200 of creating a DOP index, and a satellite signal receiver 300 will be described with reference to the drawings.

Figure 2:
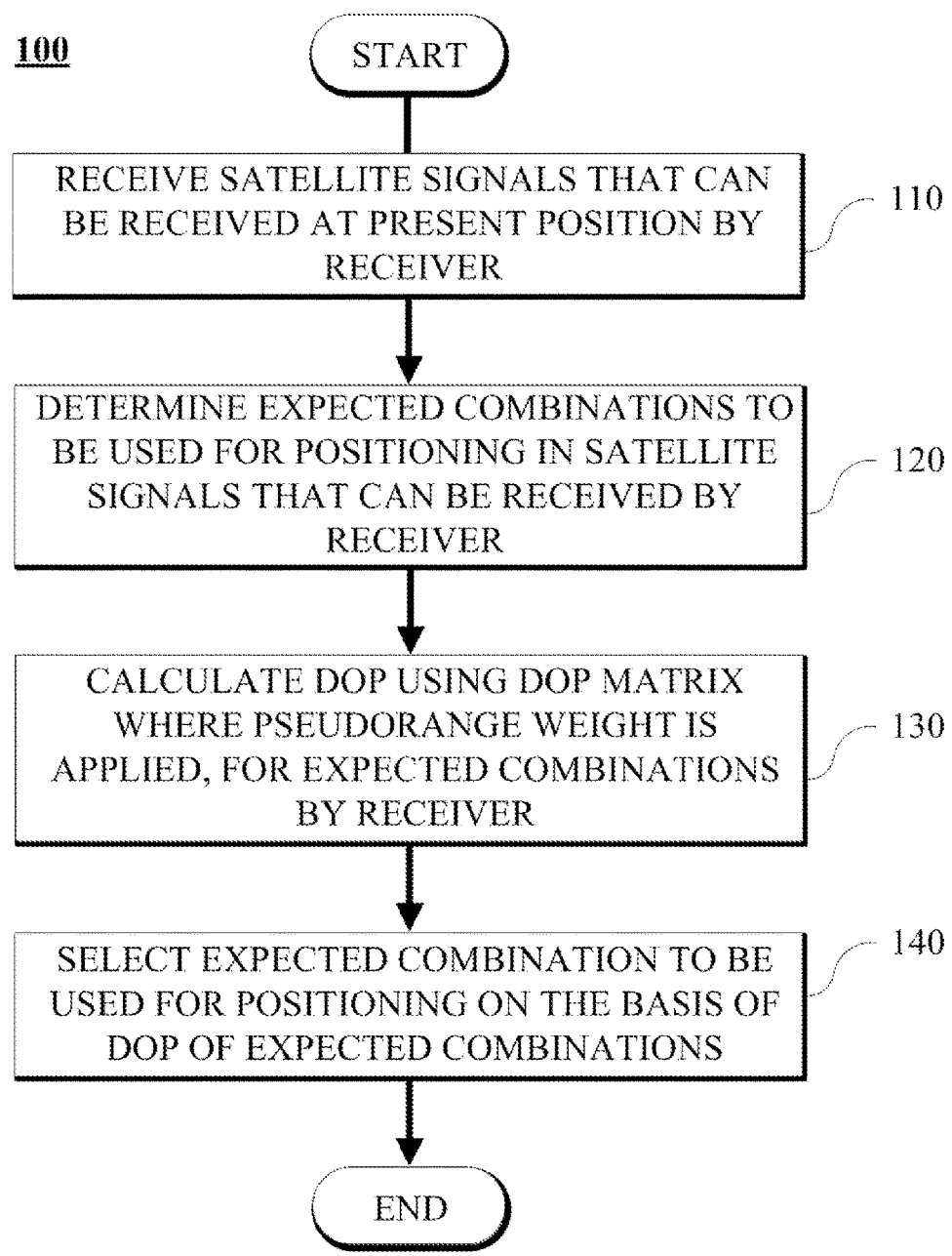
FIG. 2 is a flowchart illustrating an example of a method of selecting a satellite for positioning in a global navigation satellite system.

FIG. 2 is a flowchart illustrating an example of a method of selecting a satellite for positioning in a global navigation satellite system.

First, a satellite signal is received and a satellite signal that a receiver for positioning receives is a satellite signal that can be received at the present position (110). The receiver receives information of line of sight (vector of line of sight) of the corresponding satellite from the satellite signal. Alternatively, it may receive only the information of a vector of line of sight.

Thereafter, the receiver determines expected combinations to be used for positioning from available satellite signals (120). In general, since four or more satellites are used for positioning, possible expected combinations including at least four or more of available satellites are determined.

The receiver calculates DOP using a DOP matrix obtained by applying the pseudorange weight to each of expected combinations (130) and selects an expected combination to be used for positioning on the basis of the calculated DOP (140). That is, the finally selected expected combination corresponds to a satellite to be used for positioning by the receiver.

The satellite signal may be a signal in which at least one of transmission power or a modulation type is different. In detail, the satellite signal may include at least one of a GPS satellite signal, a Galileo signal, and a GLONASS signal.

In the calculating (130), the receiver can calculate the DOP using a DOP matrix having the ratio of a reciprocal of TESD for CNR of the satellite signal as weight. On the other hand, when the receiver has difficulty in estimating CNR, the reciprocal of the TESD at the worst CNR may be used as weight.

In the calculating 130, the receiver can calculate $D_{proposed}$ in Equation 4 described above.

In the selecting (140), it may be possible to select an expected combination having the smallest DOP in the satellite signal combinations or may be possible to select a combination having DOP identical to or less than a predetermined reference value as the final expected combination by a receiver. Therefore, positioning is performed by satellites in the final expected combination.

Figure 3:
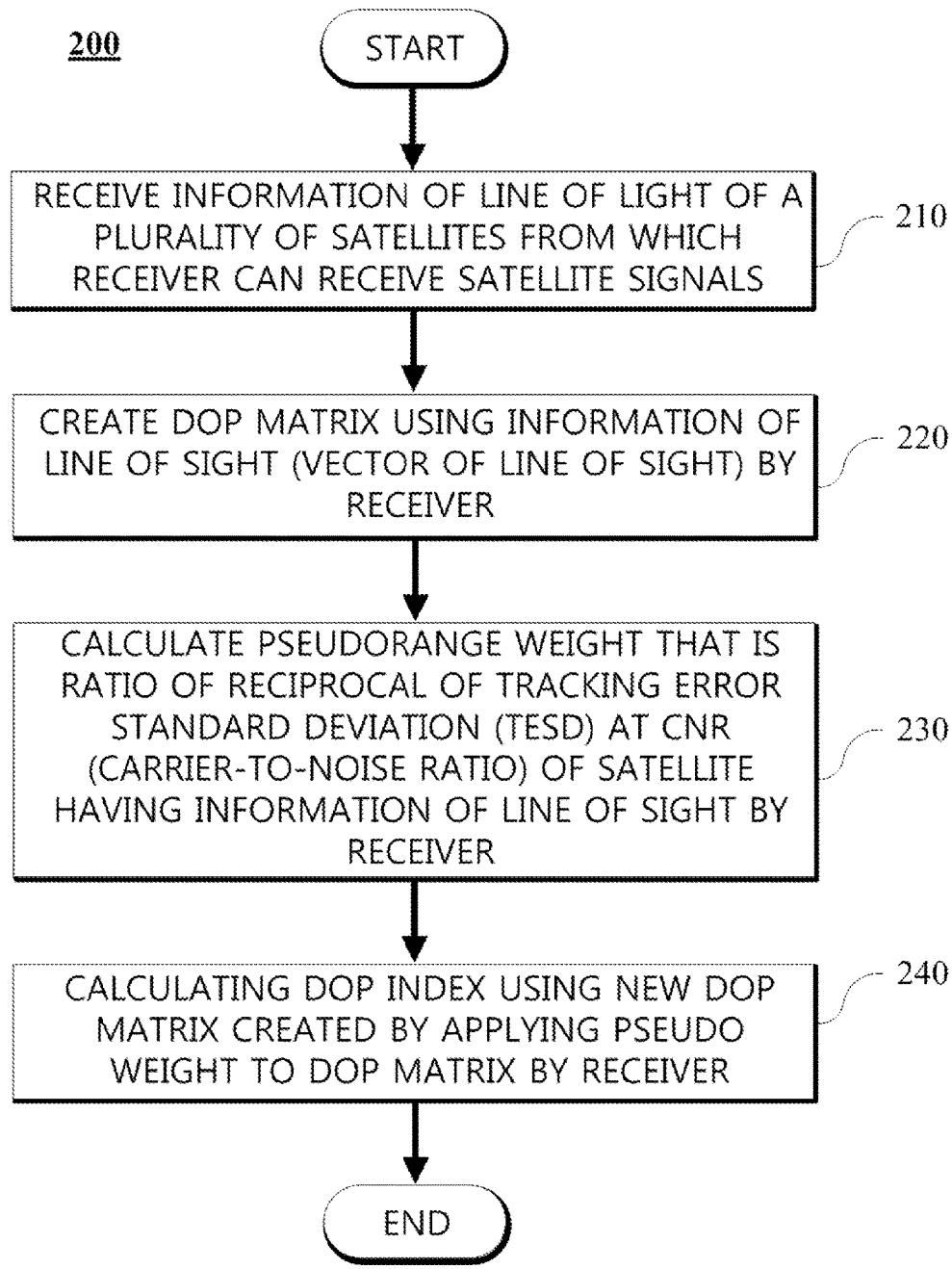
FIG. 3 is a flowchart illustrating an example of a process of calculating a DOP index.

FIG. 3 is a flowchart illustrating an example of a process 200 of calculating a DOP index. The process 200 of calculating a DOP index includes: receiving information of line of sight of a plurality of satellites of which signals can be received by a receiver (210); creating a DOP matrix using the information of line of sight by the receiver (220); calculating pseudorange weight that is the ratio of the reciprocal of TESD at the CNR of a satellite having the information of line of sight by the receiver (230); and calculating a DOP index using a new DOP matrix created by applying the pseudorange weight to the DOP matrix (240).

Figure 4:
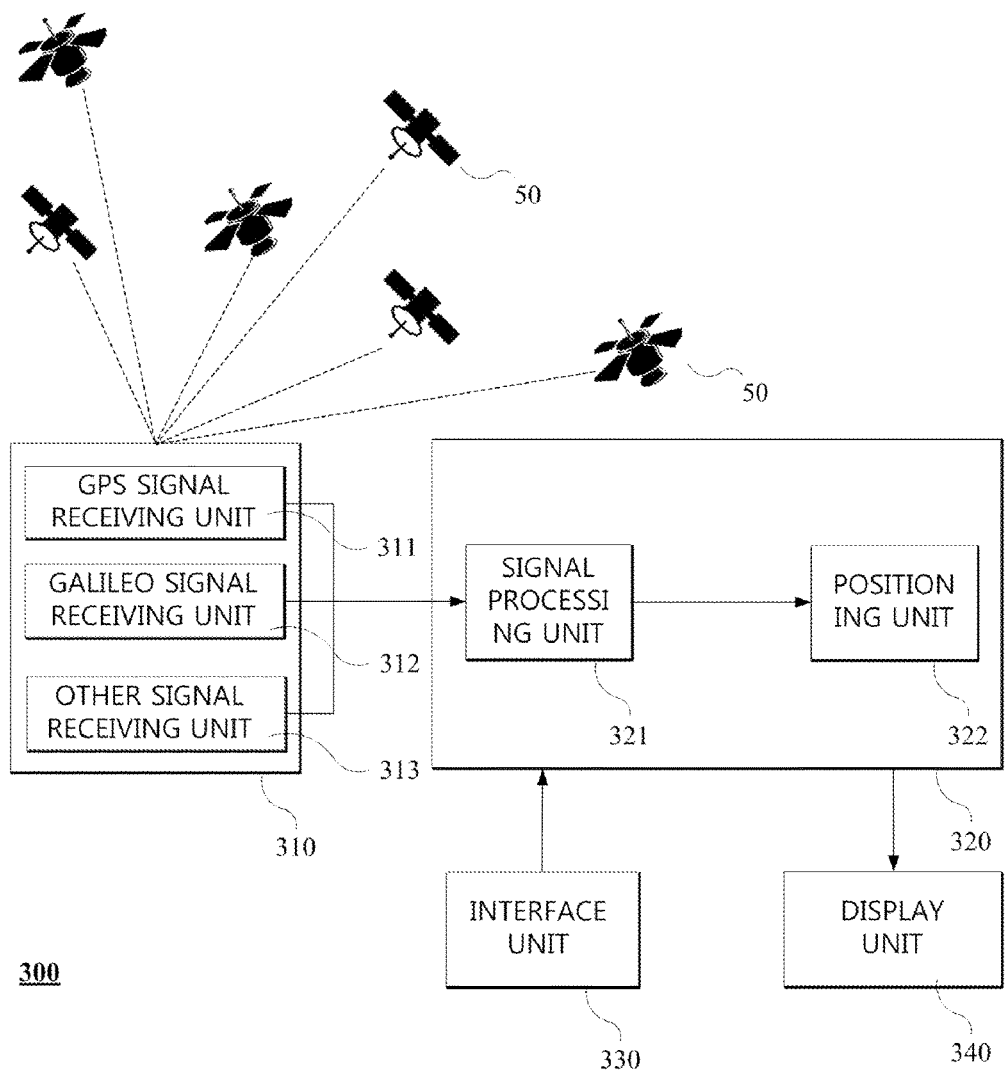
FIG. 4 is a block diagram illustrating an example of the configuration of a satellite signal receiver.

FIG. 4 is a block diagram illustrating an example of the configuration of the satellite signal receiver 300.

The satellite signal receiver 300 can receive satellite signals from a plurality of satellites 50. That is, it is required to receive satellite signals from at least four or more satellites and it has to be able to receive over four satellite signals in order to create expected combinations of satellite signals.

The satellite signal receiver 300 includes: a receiving unit 310 that receives satellite signal in which at least one of transmission power and a modulation type is different; a signal processing unit 321 that calculates DOP where pseudorange weight is applied for satellite signal combinations including at least four or more of satellite signals; and a positioning unit 322 that selects a satellite signal combination having the smallest DOP calculated by the signal processing unit and positions the receiver.

The receiving unit 310 includes a receiving device such as an antenna that can receive signals in order to receive signals in which the modulation type and the transmission power are different. FIG. 4 illustrates, as an example, a GPS signal receiving unit 311 that can receive GPS signals, a Galileo signal receiving unit 312 that can receive Galileo signals, and another satellite signal receiving unit 313 that can receive other satellite signals.

The signal processing unit 321 that determines combinations of received satellite signals and selects a satellite and the positioning unit 322 that performs positioning using the selected satellite may be included in a calculator 320 of an actual receiver. Obviously, at least one of the signal processing unit 321 and the positioning unit 322 may be implemented in the type of a chipset including a specific embedded program.

An interface unit 330 receives specific orders from a user and a display unit 340 displays a positioning result.

The signal processing unit 321 can calculate the DOP using a DOP matrix having the ratio of a reciprocal of TESD for CNR of the satellite signal as weight. The CNR range may be a concerned range set in advance by a user or the system.

The signal processing unit 321 can calculate DOP using $D_{proposed}$ in Equation 4 described above.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of selecting a satellite for positioning in a global navigation satellite system, the method comprising:
   receiving, by a receiver, satellite signals from satellites;
   calculating, by the receiver, Dilution of Precision (DOP) in which a pseudorange weight is applied for each of satellite signal combinations comprising at least four of the satellite signals; and
   selecting, by the receiver, a satellite signal combination, among the satellite signal combinations, having a smaller DOP than a standard value of the satellite signal combinations, to be used to position the receiver.

2. The method of claim 1, wherein the satellite signals comprise signals differing in either one or both of a transmission power and a modulation type.

3. The method of claim 1, wherein the satellite signals comprise any one or any combination of any two or more of a GPS satellite signal, a Galileo satellite signal, and a GLONASS signal.

4. The method of claim 1, wherein in the calculating, the receiver determines the pseudorange weight based on Tracking Error Standard Deviation (TESD) of a pseudorange of the satellite signals, and calculates the DOP using a DOP matrix comprising the pseudorange weight.

5. The method of claim 1, wherein in the calculating, the receiver determines a weight providing a same or similar TESD in a reference range to the satellite signals in a Carrier-to-Noise Ratio (CNR), and calculates the DOP using a DOP matrix comprising the weight providing the same or similar TESD.

6. The method of claim 5, wherein the receiver determines the weight using TESD at a worst CNR, in response to the receiver encountering difficulty in estimating a CNR.

7. The method of claim 1, wherein in the calculating, the DOP is calculated by the following equation:

$$D_{proposed} = tr[(H'^T H')^{-1}],$$

where $D_{proposed}$ is the DOP, $tr(\bullet)$ is trace of a matrix, $(\bullet)^T$ is transposition of a matrix, $(\bullet)^{-1}$ is an inversematrix, $$H' = \begin{bmatrix} \alpha_1 h_{11} & \alpha_1 h_{12} & \alpha_1 h_{13} & 1 \\ \alpha_2 h_{21} & \alpha_2 h_{22} & \alpha_2 h_{23} & 1 \\ \vdots & \vdots & \vdots & \vdots \\ \alpha_n h_{n1} & \alpha_n h_{n2} & \alpha_n h_{n3} & 1 \end{bmatrix},$$

$(h_{i1}, h_{i2}, h_{i3})$ is a vector of line of sight from a user to an i-th satellite, and $\alpha_i$ is a weight providing the same or similar TESD.

8. The method of claim 1, wherein the satellite signal combination has a smallest DOP of the satellite signal combinations.

9. A satellite signal receiver, comprising:
   a receiving unit configured to receive satellite signals in which either one or both of a transmission power and a modulation type is different;
   a signal processing unit configured to calculate a Dilution of Precision (DOP) where a pseudorange weight is applied for satellite signal combinations comprising at least four of the satellite signals; and
   a positioning unit configured to select a satellite signal combination, among the satellite signal combinations, having a smallest DOP calculated by the signal processing unit, and to position the receiver.

10. The satellite signal receiver of claim 9, wherein the satellite signals comprise any one or any combination of any two or more of a GPS satellite signal, a Galileo satellite signal, and a GLONASS signal.

11. The satellite signal receiver of claim 9, wherein signal processing unit is further configured to determine a weight for the satellite signals based on a Tracking Error Standard Deviation (TESD) of a pseudorange of the satellite signals included in the satellite signal combinations, and to calculate the DOP using a DOP matrix including the weight.

12. The satellite signal receiver of claim 9, wherein the receiver is further configured to determine a weight providing a same or similar TESD in a reference range to the satellite signals in a Carrier-to-Noise Ratio (CNR), and to calculate the DOP using a DOP matrix having the weight.

13. The satellite signal receiver of claim 9, wherein the DOP is calculated using the following equation:

$$D_{proposed} = tr[(H'^T H')^{-1}],$$

where $D_{proposed}$ is the DOP, tr($\cdot$) is trace of a matrix, $(\cdot)^T$ is transposition of a matrix, $(\cdot)^{-1}$ is an inversematrix, $$H' = \begin{bmatrix} \alpha_1 h_{11} & \alpha_1 h_{12} & \alpha_1 h_{13} & 1 \\ \alpha_2 h_{21} & \alpha_2 h_{22} & \alpha_2 h_{23} & 1 \\ \vdots & \vdots & \vdots & \vdots \\ \alpha_n h_{n1} & \alpha_n h_{n2} & \alpha_n h_{n3} & 1 \end{bmatrix},$$

($h_{i1}$, $h_{i2}$, $h_{i3}$) is a vector of line of sight from a user to an i-th satellite, and $\alpha_i$ is weight providing a same or similar TESD.

* * * * *